(12) United States Patent
Yanagisawa et al.

(10) Patent No.: US 7,110,601 B2
(45) Date of Patent: Sep. 19, 2006

(54) METHOD FOR DETECTING LINEAR IMAGE IN PLANAR PICTURE

(75) Inventors: Toshifumi Yanagisawa, Fuchu (JP); Atsushi Nakajima, Fuchu (JP)

(73) Assignees: Japan Aerospace Exploration Agency, Tokyo (JP); Japan Science and Technology Corporation, Saitama (JP)

( * ) Notice: Subject to any disclaimer, the term of this patent is extended or adjusted under 35 U.S.C. 154(b) by 684 days.

(21) Appl. No.: 10/277,881

(22) Filed: Oct. 23, 2002

(65) Prior Publication Data

US 2006/0110007 A1    May 25, 2006

(30) Foreign Application Priority Data

Oct. 25, 2001    (JP)    ............................... 2001-328319

(51) Int. Cl.
*G06K 9/00*    (2006.01)
(52) U.S. Cl. ...................................... 382/181; 382/291
(58) Field of Classification Search ................ 382/103, 382/151, 173, 181, 202, 282, 291
See application file for complete search history.

(56) References Cited

U.S. PATENT DOCUMENTS 5,684,894 A * 11/1997 Shustorovich .............. 382/232

OTHER PUBLICATIONS

Hendry, et al."Automated linear feature detection and its application to curve location in synthetic radar imagery", IEEE, 1988, pp. 1521-1524.*

English translation of Abstract of the Foundation for Promotion of Japanese Aerospace Technology (JAST), Result Report of Survey and Study for Optical Telescopes for Observing Debris and Small planets in the Vicinity of the Earth, Mar. 1998.

* cited by examiner

*Primary Examiner*—Daniel Mariam
(74) *Attorney, Agent, or Firm*—Westerman, Hattori, Daniels & Adrian, LLP.

(57) ABSTRACT

A method for detecting a linear image in a planar picture is provided whereby the positions of a linear image can be determined by devising suitable processing of image data, even if a linear image traced by a moving object, such as space debris, a meteor, or the like, does not appear clearly on a picture. Image data processing, consisting of division processing (S2) for dividing image data of a planar picture captured by an imaging element into a plurality of mutually parallel columnar image data and representative value selection processing (S3) for taking the median value determined for each of the columnar image data as a representative value for the corresponding columnar image data, is performed in every direction of said planar picture, whereupon analysis processing consisting of significant value detection processing (S6) for detecting whether or not said representative value of each of said columnar image data is a significant value, and linear image position identification processing (S7) for identifying the linear position of columnar image data having a representative value indicating a significant value as the position of a linear image resulting from the passage of the moving object or the like, is performed.

9 Claims, 6 Drawing Sheets

DEBRIS

METEOR

TELESCOPE + CCD CAMERA

Fig. 10

METHOD FOR DETECTING LINEAR IMAGE IN PLANAR PICTURE

BACKGROUND OF THE INVENTION

1. Field of the Invention

The present invention relates to a method of detecting linear images in planar pictures, whereby linear images like that traced by a moving object, such as debris following an orbit, can be detected from a planar picture depicting an object, such as a night sky, or the like, captured by means of an imaging element, such as a CCD imaging element, for example.

2. Description of the Related Art

With the progress of space exploration in recent years, the number of rockets and artificial satellites launched has increased, and as a result, there is a large amount of space debris (space garbage) of various sizes, circling in the space surrounding the earth, including not only natural objects, such as space dust, but also artificial satellites, rockets and boosters which are no longer in use, or pieces or broken shards of same, or flakes of paint peeled off same, and the like.

In the use of celestial space, in addition to the unmanned artificial satellites orbiting the earth, there are other celestial objects in flight and orbit, such as manned spacecraft, space shuttles, space stations, and the like, and furthermore, journeys outside the spacecraft are also made by astronauts. This use of and activity in celestial space is carried out in a region of space traversed by large quantities of flying space debris, and as spacecraft and flying objects get larger in size and spend longer flight times in space, so the risk of these craft and objects, or astronauts performing a journey outside the craft, being struck by space debris gradually increases. Although space debris only has a size of several millimeters, for example, and collisions with same are extremely rare, if a collision does occur, the impact energy will be very high, due to the extremely fast relative velocity on impact, and hence the craft or object may be damaged and the lives of the astronauts put in danger. With increasing exploration and use of space in the future, it can be expected that the amount of space debris originating from artificial objects will rise further, and hence the danger of collision with this space debris will continue to increase.

Therefore, as one means of avoiding collisions with space debris, there have been demands for monitoring of space debris to be increased. By identifying the orbital path of individual items of space debris by performing monitoring, it is possible to predict space debris that has a possibility of coming close to an object or craft, and hence avoid collisions in advance.

Conventionally, space debris orbiting the earth has been tracked and monitored principally on the basis of earth-based observation by radar, or cameras attached to telescopes. In earth-based observation, a method for detecting linear images on a CCD picture is employed, and a method based on the Hough transform is generally used to detecting these linear images. In the Hough transform, it is necessary that the linear images appear clearly on the CCD picture, and therefore, it is not possible to provide satisfactory observation of space debris, which is small and dark and cannot be treated as a linear image on the picture.

In current international observation networks, any items 10 cm or above in size can be observed easily, and hence their orbits are being identified and catalogued, but any debris in the range of 1 cm–10 cm in size is not being observed or catalogued. Space debris of 1 cm or less in size will have relatively low impact energy in the event of a collision, and therefore protecting means, such as debris bumpers, or the like, provided on spacecraft, can be used against this debris, but any items of debris of 1 cm or larger will have too great an impact energy to be protected against by this means. It has been proposed that observation devices be installed in artificial satellites and spacecraft in order to monitor space debris which is 10 cm or less(for example, Japanese Patent Application Laid-open No. H5-286500, or Japanese Patent Application Laid-open No. 2000-190900). When launch expenses are taken into account, installing an observation device in a artificial satellite or spacecraft involves very great cost. Space exploration involving activities outside the craft is usually carried out from spacecraft circling in low altitude orbits, and therefore, environmental monitoring of debris several centimeters in size travelling in low orbit is absolutely essential in order to protect humans from collision with debris whilst performing space exploration activities in the future.

Other dark objects similar to the space debris from man-made objects include objects of natural origin, such as space dust and meteors. Images captured of these objects generated contain noise, which make the objects hard to detect.

Therefore, it is necessary to provide a way of identifying the position of a linear image representing the path of an object in a picture, by devising suitable image data processing of a planar picture, even in the case of a planar picture where linear images, such as the trails caused by movement of an object, do not appear clearly.

SUMMARY OF THE INVENTION

It is an object of the present invention is to provide a method for detecting a linear image in a planar picture whereby the position of a linear image in the picture can be identified, and more particularly, to enable a linear image of an object of low brightness, such as space debris, meteors, or the like, to be determined and the trajectory thereof to be identified, from captured pictures in which the linear image does not appear clearly, by means of processing the image data of a planar picture obtained by observation from the earth's surface.

In order to achieve this object, in the method for detecting a linear image according to the present invention, image data processing, consisting of division processing for dividing image data of a planar picture captured by an imaging element into a plurality of mutually parallel columnar image data and representative value selection processing for taking the median value determined for each of the columnar image data as a representative value for the corresponding columnar image data, is performed in every direction of the aforementioned planar picture, whereupon analysis processing consisting of significant value detection processing for detecting whether or not the representative value of each of the columnar image data is a significant value, and linear image position identification processing for identifying the linear position of columnar image data having a representative value indicating a significant value as the position of a linear image, is performed.

According to this linear image detection method, the planar picture is a picture corresponding to the light quantities accumulated by an imaging element over a prescribed exposure time, and in the image data processing, division processing for dividing the image data of the planar picture captured by the imaging element into a plurality of mutually parallel columnar image data and representative value selection processing for taking the median value determined for each of the columnar image data as a representative value for the corresponding columnar image data, is performed in every direction of the planar picture. Supposing that there is a linear image in the planar picture which does not appear clearly since it is obscured by noise, then if the linear image simply traverses the columnar image data obtained by the division processing, there is a possibility that the pixel data will show a significant value at the very position where it is traversed by the linear image, but since the number of pixel data belonging to that particular columnar image data is much greater, an image data value of this kind is hardly ever reflected in the median value determined by finding the centrally placed value of all the values of the columnar image data when arranged in order of magnitude.

If it is supposed that, in performing image data processing in all directions of the planar picture, the columnar image data divided in a particular direction coincides with the linear image, then the image data belonging to that columnar image data will be almost entirely affected by the presence of the linear image, even if it is obscured by noise, and hence a significant value will appear as the median value, from which it will be recognisable that it coincides with a linear image. The analysis processing performed after the image data processing has been completed in all directions of the planar picture consists of: significant value detection processing for detecting whether or not the representative value of each of the columnar image data is a significant value, and linear image position identification processing for identifying the linear position of columnar image data having a representative value indicating a significant value as the position of a linear image. In the significant value detection processing, representative values indicating significant values are detected from the sets of representative values obtained by the image data processing performed in every direction of the planar picture, and in the linear image position identification processing, the linear position of columnar image data having a representative value indicating a significant value is taken as the position of a linear image in the picture. In this way, it is possible significantly to reduce the noise level and detect linear images below the original noise level of the original picture, by deriving the median value of each image series data in all direction of a planar picture captured by an imaging element.

In this method for detecting a linear image, the division processing can be performed with respect to columns parallel to two mutually orthogonal axes when the planar picture is represented on a co-ordinates system based on orthogonal co-ordinates. If the planar picture is represented on a co-ordinates system using orthogonal co-ordinates, then the division processing of the image data can be performed by a method such as obtaining columns respectively parallel to two orthogonal axes, namely, a vertical axis and horizontal axis, each column having a width of one pixel.

In this method for detecting a linear image, the image data processing can be performed in all directions of the planar picture, by rotating the planar picture and performing the division processing with respect to columns parallel to the two mutually orthogonal axes of the orthogonal co-ordinates system applied to the planar picture, after each rotation. Two sets of columnar image data respectively parallel to the two orthogonal axes, namely, the vertical axis and horizontal axis, are created with respect to a single orthogonal co-ordinates system, but by sequentially rotating the orthogonal co-ordinates system, image data processing can be performed in all directions of the planar picture. If the orientation of the same linear image in directions opposed at 180° is disregarded, then the picture can be divided in all direction by rotating the co-ordinates system between 0° and 90°.

In this method for detecting a linear image, desirably, if the planar picture contains an image region indicating an abnormal value for the value of the image data, due to an excessive light reception level, mask processing is performed for replacing the value of the image data in the image region with a median value of background noise, the image data processing being carried out on the basis of the image data after the mask processing has been performed. If there is a region on the planar picture having an abnormal value for the image data value due to an excessive light reception level, a large number of pixel data belonging to the same columnar image data indicate an abnormal value, then there is a possibility that the median value derived for that columnar image data will be affected by these abnormal values. Hence, by performing mask processing of the region, the aforementioned abnormal values can be excluded from the image data, and hence the effects thereof can be eliminated in advance.

In this method for detecting a linear image, the trajectory of a moving object creating the linear image is identified by performing the image data processing and the analysis processing with regard to respective image data captured simultaneously at two separately situated observation positions. Since the distance between the two observation positions is known, the trajectory of the moving object creating a linear image can be calculated by triangulation, and therefore the distance between the straight line linking the two observation positions and the trajectory of the moving object can be determined.

In this method for detecting a linear image, the planar picture may be a picture of the sky captured using a CCD imaging element as the imaging element, and the linear image may be the image of a flying object, such as space debris, a meteor, or the like, passing through the atmosphere. If a region of the sky is considered separately, then space debris or meteors can be regarding as travelling in a straight line. Therefore, even if it cannot be told at a glance of the planar picture that space debris or a meteor has passed over, due to its being obscured by noise, when the planar picture data is divided up into a plurality of columnar image data, if one of the pixel columns coincides with the trajectory of the space debris or meteor, then the amount of light captured by the CCD imaging element will be greater than that captured with no space debris or meteor has passed, and hence almost every respective pixel data constituting the columnar image data will indicate a high value. As a result, the median value used as the representative value for the columnar image data coinciding with the trajectory will indicate a significant value that is different from the representative values of the other columnar image data, and hence the trajectory of the space debris or meteor can be detected. By taking the median value as the representative value of the columnar image data, a pixel data value of very high light reception level, such as that obtained when imaging a star, will have little effect on the representative value, compared to a case where the average value is used as the representative value.

In this method for detecting a linear image, if the planar picture contains an image region indicating an abnormal value for the image data, due to an excessive light reception level received from a bright star in the sky, then desirably, mask processing is performed for replacing the image data for the image region with a median value of the sky background, the image data processing being carried out on the basis of the image data after the mask processing has been performed. If the image data value is an abnormal value indicating an excessive light reception level from a bright star, then this has the possibility of imparting a bias to the representative value in the representative value selection processing, and therefore, desirably, such anomalous values are removed by mask processing.

In this method for detecting a linear image, the altitude of the flying object creating the linear image can be identified by performing the image data processing and the analysis processing with regard to respective image data obtained by imaging the sky simultaneously at two mutually separated observation positions. If the two observation position are located on the land and the distance between them is known, then the path of the flying object creating the linear image can be calculated by triangulation, and hence the distance between the straight line linking the two observation positions and the trajectory of the flying object, in other words, the altitude of the flying object, can be determined.

In this method for detecting a linear image, desirably, the CCD imaging element is mounted on a camera having a wide angle and short exposure time, in cases where the flying object is a meteor. Since a meteor travels at a lower altitude that low-orbiting debris, and moreover, since it shines very brightly due to frictional heat caused by contact with the upper atmosphere, despite the fact that it is very small in size, then it can be imaged satisfactorily even using a short exposure time. Therefore, it is possible to capture images using a camera with a small aperture but a wide imaging angle covering a broad field of view.

DESCRIPTION OF THE PREFERRED EMBODIMENTS

An embodiment of the linear image detecting method according to the present invention is described with reference to the drawings.

Figure 1:
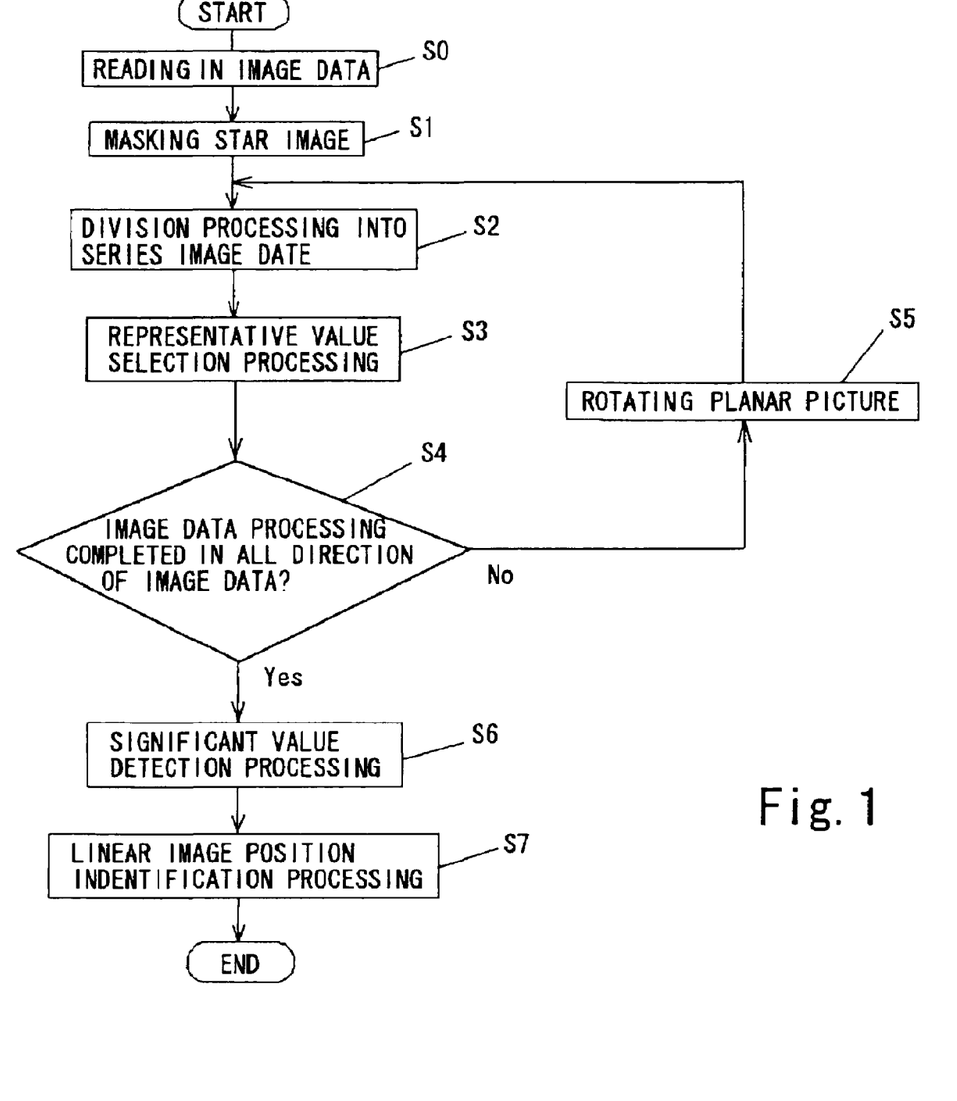
FIG. 1 is a flowchart showing respective processes of a method for detecting a linear image in a planar picture according to the present invention.
Figure 2:
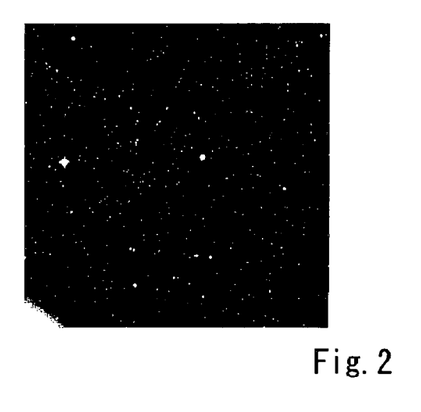
FIG. 2 is a CCD planar picture showing one example of a night sky captured by a CCD camera position on a telescope.
Figure 3:
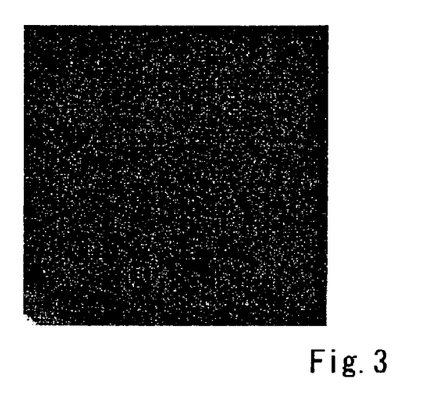
FIG. 3 shows an image wherein the planar picture in FIG. 2 has been subjected to mask processing.

The planar picture shown in FIG. 2 is a CCD picture of the sky (in this case, the night sky) captured by a camera provided with a CCD imaging element installed in a telescope. In this planar picture, a large number of stars can be identified, but the linear images of low-altitude debris or meteors, if such exist, are difficult to identify because they are obscured by noise. In the linear image detecting method for planar pictures according to the present invention, as illustrated by the flowchart in FIG. 1, the image data of this planar picture is read into a calculating device, such as a PC (S0), and mask processing (S1) for removing the star images from the picture data is performed. The image data processing for achieving a median value picture, described hereinafter, involves statistical processing where a relatively small number of irregular values have little effect on the representative value, but even so, in the case of a bright star, the value of the image data corresponding to the star will correspond to an excessive amount of light, and hence there is a possibility that this will have the effect of shifting the median value to a greater amount of light. Therefore, when a star the brightness of which is above a certain prescribed level is detected, mask processing is performed by applying to the image a circular mask pattern corresponding to the brightness, thereby previously removing the star images. The image data in the region masked in this way is assigned the median value of the sky background (background noise). The median value of the sky background is naturally a value corresponding to a lower amount of light than that of the significant values. FIG. 3 is an image wherein the star images in FIG. 2 has been masked, and it can be seen that the bright stars have been almost completely masked.

The planar picture data Dp that has been mask processed (S1) is subjected to division processing, in which the planar picture data Dp is divided into N columns of parallel image data, which respect to orthogonal axes (vertical axis and horizontal axis) of a prescribed orthogonal co-ordinates system. Thereby, the planar picture data Dp is divided into columnar picture data in two directions separated by 90°. This columnar picture data may be pixel series data wherein the pixels are arranged in a column, and by dividing the data into i=1–N in the x axis direction, a plurality of pixel series data Dxi (i=1–N) parallel to the y axis can be analyzed, and by dividing the data into j=1–N in the y axis direction, a plurality of pixel series data Dyj (i=1–N) parallel to the x axis can be analyzed. Representative value selection processing is performed by statistical data processing for obtaining a median value Dxci (i=1–N) for each i value of the plurality of pixel series data Dxi (i=1–N) thus analyzed (S2). In other words, for each i value, the pixel series data Dxi is a data group of N pixel data located adjacently in the y axis direction, and by reordering this pixel data in order of magnitude, the pixel data Dxci located at the median position thereof is selected as the representative value of the pixel series data Dxi (S3). Similarly, statistical data processing is performed to find median value Dycj (j=1–N) for the each of the respective plurality of divided pixel series data Dyj (j=1–N) (S3).

By finding the median values of the serial pixel data constituted by the plurality of pixel data, the noise level is reduced, as indicated by equation (1).

$$\sigma median = 1.2\sigma/\sqrt{N} \quad (1)$$

Here, σ is the noise level of the CCD picture (deviation from average value, in other words, taking sum or integral of squared noise values multiplied by probability density function as variance, and finding standard deviation as positive square root thereof);

σmedian=noise level after obtaining median value (average value obtained by finding square root of variance from processing N images of the same region of sky (N times the variance of one image), and dividing by number of images, N);

N is the number of pixels in the direction of the arrow used to drive the median value.

In statistical terms, in order to reduce the noise level more efficiently, it is more suitable to obtain the average value as the representative value rather than the median value, but if the average value of the pixel series data Dxi, Dyj is used as the representative value of this pixel series data, then this average value may include data readings of abnormal values taken by imaging a bright start which has not been fully masked, and consequently it is difficult to remove the effects of abnormal values. Even if there is data for a star image that is depicted brightly, since the number of such images is generally limited, this star image data is removed by using representative value selection processing for finding the median values Dxci, Dycj, and hence it is possible to avoid the effect of the star image data on the median values. Therefore, a method using median values is excellent for avoiding the effects of high values caused by excessive amounts of light, such as star images, and hence the effects of star image data can be significantly reduced.

Figure 5:
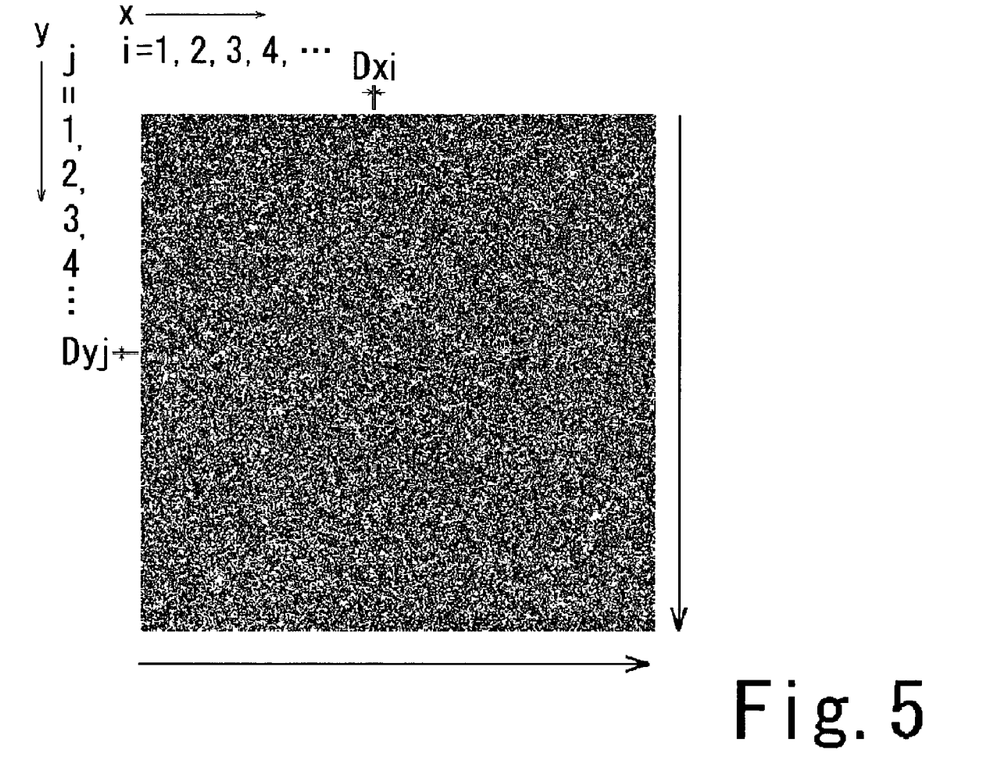
FIG. 5 shows an image to be subjected to image data processing wherein the regions affected by rotation have been removed from the image in FIG. 4.

Generally, the number of pixels in the CCD is between 1,000,000 and 4,000,000, and in the direction of the arrow in FIG. 5, it is possible to obtain N=700–1400 pixels. Therefore, the noise level after finding the median value can be reduced to about ½₀ to ⅓₀. This method, which allows a large-scale reduction in the noise level by reducing one dimension of the two-dimensional CCD picture, is only effective in cases where straight lines are left as linear images, by low-altitude debris, meteors, or the like, on a planar picture of the sky.

Figure 4:
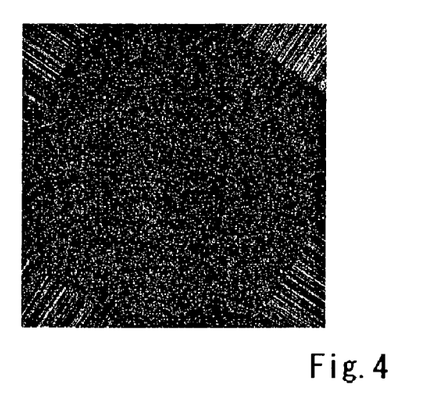
FIG. 4 shows a rotated image of the planar picture subjected to mask processing in FIG. 3.

It is determined whether or not the division of data in pixel series data and the acquisition of median values for each of the pixel series data have been completed fully in the whole 360° perimeter of the planar picture (S4). If the judgement is NO, then the image is rotated (S5). FIG. 4 shows the planar picture in FIG. 3 after rotation. The four corners are cut off by the rotation. As illustrated in FIG. 5, the area unaffected by the rotation is extracted and median values for the pixel series data are calculated for each row in the direction of the arrows parallel to the orthogonal axes (vertical axis and horizontal axis) used for the extracted planar picture.

When the image data processing has been completed in all directions of the planar picture, analysis processing is performed as illustrated in FIG. 1, consisting of significant value detection processing (S6) for detecting whether or not the representative value of each pixel series data is a significant value, and linear image position identification processing (S7) with respect to the picture, for identifying the linear position of pixel series data having a representative value indicating a significant value as the position of a linear image. This significant value detection processing (S6) and linear image position identification processing (S7) may be carried out by automatic analysis based on a software program, but it may also be performed by manual analysis based on graph plotting, as described below.

Figure 6:
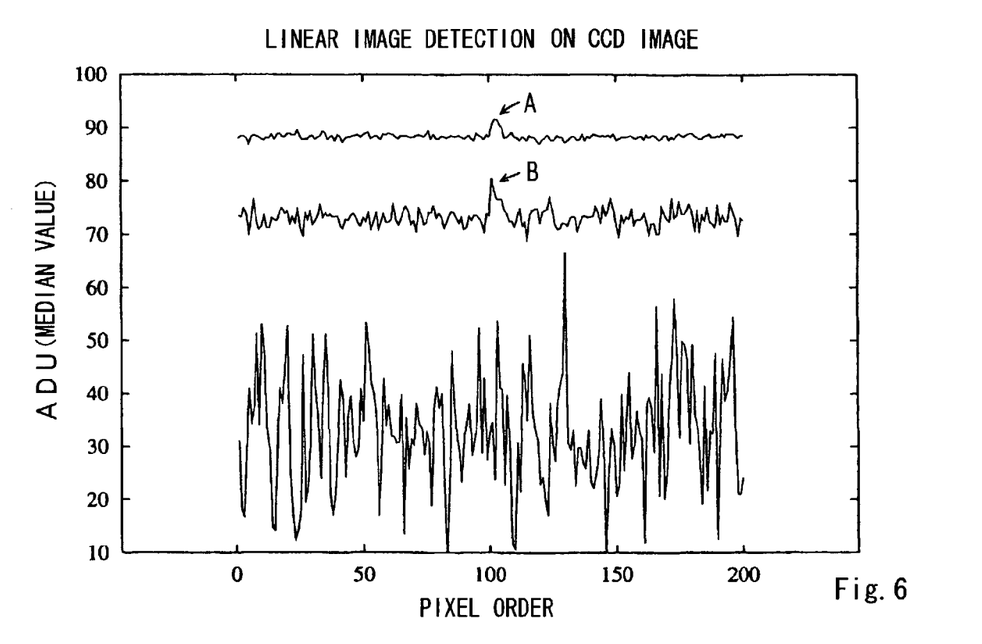
FIG. 6 is a graph showing the calculation results for the median value obtained by the method for detecting a linear image in a planar picture according to the present invention.
Figure 7:
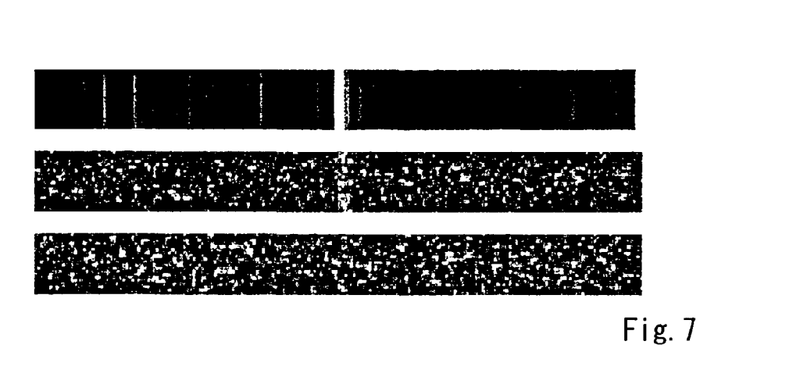
FIG. 7 is a diagram showing an image in the case of respective conditions.

FIG. 6 is a graph showing one portion of the results of calculating the median values of all the divided pixel series data in one direction of the co-ordinates system illustrated in FIG. 5. The horizontal axis indicates each row by sequential pixel numbers, and the vertical axis indicates the median value in ADU. Moreover, in order to indicate the efficiency of this software, the median values taken every 20 pixels of all the image data constituting the same serial image data, and the values of the original picture without any operation of any kind, are also shown. In FIG. 6, the median value for each pixel series data, the median value taken every 20 pixels, and the original picture values are shown in order, from the top. In order to aid understanding, in FIG. 6, a suitable number is added to the upper two values. Moreover, FIG. 7 shows pictures resulting from the respective conditions, in order from the top. Here, in order to make comparison easier, the image of the median values of the respective pixel series data is extended in the vertical direction of the paper surface. Supposing that a linear image of the low-altitude debris passes only through the intersection of the pixel series data Dxi, Dyj, and that this data is a value corresponding to a relatively high light level, then by taking the median value, this image data will not be reflected in the representative value. However, if the direction of the column of the serial image data coincides with the direction of travel of the linear image, then the weak signal of a linear image obscured by noise in the original picture can be detected by obtaining the median value of the serial image data. In other words, if the linear image of the low-altitude debris travelled exactly along the pixel series data Dxi (or Dyj), then even if it is obscured by noise, a large number of the pixel data will have significant values corresponding to a high light level, and hence when the median value of the pixel series data Dxi (Dyj) is obtained, the significant values will be reflected in the median value, as illustrated by A (or B) in the graph in FIG. 6.

Figure 8:
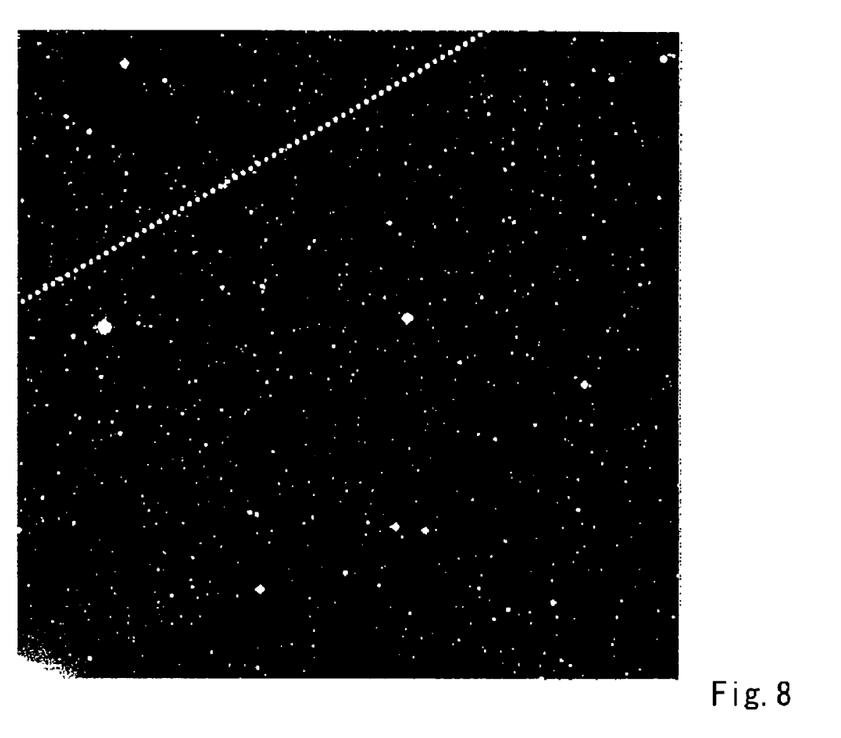
FIG. 8 shows the planar picture in FIG. 2 with the detected linear image illustrated in highlighted fashion.

In this way, since the direction in which the low-altitude debris or meteor leaves a linear image is unknown, then, in order to detect actually a dark linear image of this kind, it is necessary that the detection operation is carried out in all directions. It is possible to determine the positions on the picture through which the low-altitude debris or meteor has passed from the angle of rotation of the image and the positions of the significant values indicated by the median value results, as illustrated in FIG. 6. In the aforementioned example, FIG. 8 shows a diagram where the linear image thus determined is depicted in emphasized fashion by a dotted line on the planar picture illustrated in FIG. 2.

The possibility of observing low-altitude debris and meteors by means of the linear image detection method of the present invention was investigated. The brightness depending on the size and altitude of the space debris was found to a certain extent from previous observation results. Furthermore, as a result of analyzing CCD images obtained from a certain observation system, using a linear image detection according to the present invention, it is possible to calculate the size of low-altitude debris that can be detected, from the ADU value of stars of known brightness, the time taken to cross the field of view at a prescribed altitude, the noise level of the CCD imaging element, and the like. Table 1 shows the size of low-altitude debris that can be detected as a result of observation using a system comprising a CCD camera provided on a 50 cm and 1 m telescope installed in the Bisei Spaceguard Centre.

TABLE 1

| Altitude of debris | 200 km | 400 km | 1000 km |
|---|---|---|---|
| Size of debris detectable with 50 cm telescope | 5 cm | 9 cm | 17 cm |
| Size of debris detectable with 1 m telescope | 3 cm | 6 cm | 10 cm |

Figure 9:
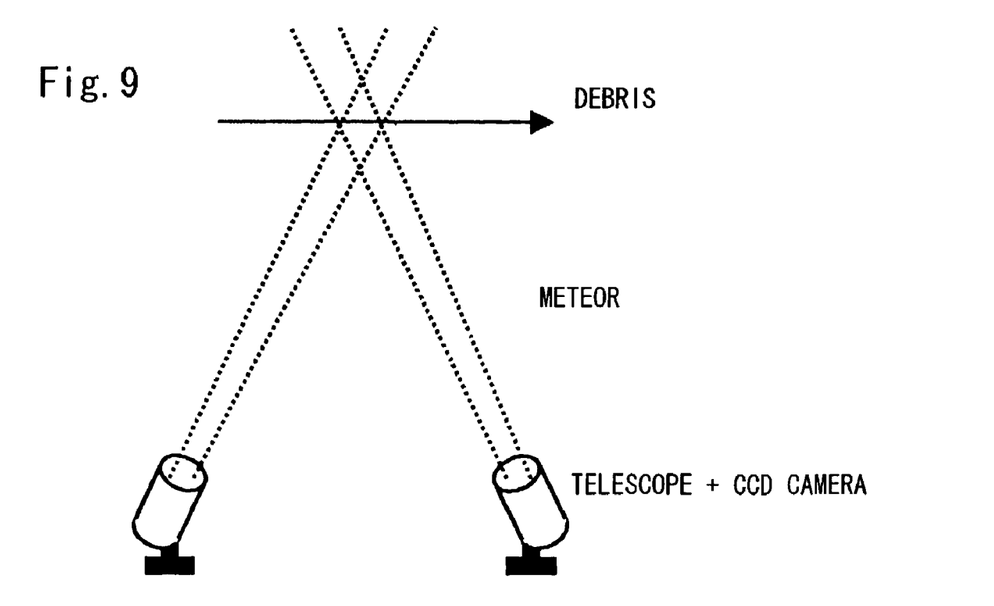
FIG. 9 is an observation system concept diagram wherein the method for detecting a linear image in a planar picture according to the present invention is applied in order to determine the altitude of the orbit corresponding to a linear image.

The brightness of the debris changes greatly with altitude. In observation using one telescope only, it is not possible to identify the altitude of the linear image detected. Furthermore, it is not possible to distinguish debris images from linear images caused by meteors. Therefore, in environmental observation of low-altitude debris, by using two telescopes separated by several tens of kilometers to 100 km, as illustrated in FIG. 9, it is possible to specify the altitude of the orbit by means of triangulation. Moreover, if the altitude of the orbit of low-altitude debris can be determined, then images of debris can be distinguished from image of meteors, a phenomenon which occurs at an altitude of around 100 km.

Figure 10:
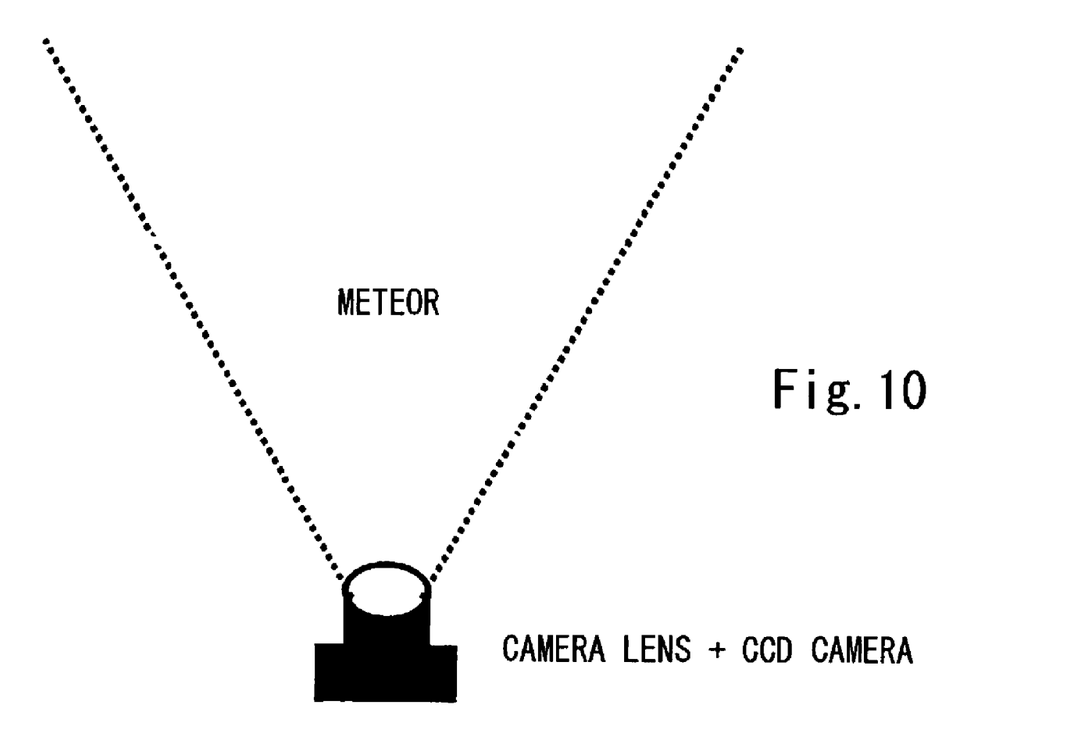
FIG. 10 is an observation system concept diagram wherein the method for detecting a linear image in a planar picture according to the present invention is applied in order to identify a dark meteor.

As an observation system for identifying dark meteors, an observation system applying the linear image detection method according to the present invention is depicted in schematic form in FIG. 10. In the example in FIG. 10, it is supposed that a camera lens of approximately 50 mm focal length is installed on a CCD camera. The characteristics of this system are such that the diameter of the optical system is small and the light gathering power is poor, but the focal distance is shortened in corresponding measure, and hence a wide field of view can be observed. Since a meteor is a phenomenon wherein light is generated by friction between a meteor particle and the earth's atmosphere, then if debris of a size of approximately several millimeters generates light as a meteor, it will have a brightness of approximately magnitude 1. Therefore, light gathering power of the order of a large-scale telescope is not required in this measurement system. Furthermore, since meteors have a high velocity compared with low-altitude debris orbiting the earth, meteors can be distinguished from debris if a wide field of view is observed using short exposure times. In an observation system wherein a 2K×2K CCD camera is fitted to a camera lens of 50 mm aperture and 50 mm focal length, it is possible to observe meteors of about magnitude 8.5. A meteor of magnitude 8.5 corresponds approximately to debris with a size of 0.4 mm. By observing meteors over a long time period with the observation system illustrated in FIG. 10, and investigating the luminosity distribution thereof, it is anticipated that new findings can be made with respect to the environment of debris of 0.1 mm to several millimeters in size, which it is feared may affect astronauts performing manoeuvres outside a spacecraft at low altitudes.

This invention may be used not only for discovering space debris and meteors, but also may be applied to any usage having the objective of detecting linear images obscured by noise, from a planar picture representation created by any method, for instance, for investigating man-made objects indicated by a line from a degraded paper surface or wall surface, investigating fractures in structures, investigating traffic volume at night, investigating tracks configured in a linear shape obscured in the desert, discovering tricks and traces of modifications in modified photographs, and the like.

As described above, according to the linear image detection method of the present invention, image data processing, consisting of division processing for dividing image data of a planar picture captured by an imaging element into columnar image data for a plurality of mutually parallel columns, and representative value selection processing for taking the median value determined for each of said columnar image data as a representative value for that columnar image data, is performed in every direction of the aforementioned planar picture, whereupon analysis processing consisting of significant value detection processing for detecting whether or not said representative value of each of said columnar image data is a significant value, and linear image position identification processing for identifying the linear position of columnar image data having a representative value indicating a significant value as the position of a linear image, is performed, and therefore, it is possible to identify the position of a linear image by devising suitable processing of picture data, even if a linear image, such as the path of movement of an object, or the like, does not appear clearly on the picture. Consequently, according to the present invention, when applied to the observation of the path of orbiting objects, such as space debris, or the like, it is possible readily to identify linear images which do not appear clearly on a planar picture, such as linear images of dark objects, such as space debris, meteors, or the like, by suitable processing of a picture obtained by land-based observation, without having to mount observation equipment in a artificial satellite, spacecraft, or the like.

What is claimed is:

1. A method for detecting a linear image in a planar picture, wherein image data processing, consisting of division processing for dividing image data of a planar picture captured by an imaging element into a plurality of mutually parallel columnar image data and performing representative value selection processing in every direction of said planar picture for taking the median value determined for each of said columnar image data as a representative value for the corresponding columnar image data, whereupon analysis processing, consisting of significant value detection processing for detecting whether or not said representative value of each of said columnar image data is a significant value, and performing linear image position identification processing for identifying the linear position of columnar image data having a representative value indicating a significant value as the position of a linear image.

2. The method for detecting a linear image in a planar picture according to claim 1, wherein said division processing is performed with respect to columns along two mutually orthogonal axes when said planar picture is represented on a co-ordinates system based on orthogonal co-ordinates.

3. The method for detecting a linear image in a planar picture according to claim 2, wherein said image data processing is performed in all directions of said planar picture, by rotating said planar picture and performing said division processing with respect to columns along said two mutually orthogonal axes of said orthogonal co-ordinates system applied to said planar picture, after each rotation.

4. The method for detecting a linear image in a planar picture according to claim 1, wherein, if said planar picture contains an image region indicating an abnormal value for the value of said image data, due to an excessive light reception level, mask processing is performed for replacing the value of said image data in said image region with a median value of background noise, and said image data processing is carried out on the basis of said image data after said mask processing has been performed.

5. The method for detecting a linear image in a planar picture according to claim 1, wherein the trajectory of a moving object creating said linear image is identified by performing said image data processing and said analysis processing with regard to respective image data captured simultaneously at two mutually separated observation positions.

6. The method for detecting a linear image in a planar picture according to claim 1, wherein said planar picture is a picture of the sky captured using a CCD imaging element as said imaging element, and said linear image is the image of a flying object, such as space at least debris or a meteor, passing through the sky.

7. The method for detecting a linear image in a planar picture according to claim 6, wherein, if said planar picture contains an image region indicating an abnormal value for said image data, due to an excessive light reception level received from a bright star in said sky, then mask processing is performed for replacing said image data for said image region with a median value of the sky background, and said image data processing is carried out on the basis of said image data after said mask processing has been performed.

8. The method for detecting a linear image in a planar picture according to claim 6, wherein the altitude of said flying object creating said linear image is determined by performing said image data processing and said analysis processing with regard to respective image data obtained by imaging said sky simultaneously at two mutually separated observation positions.

9. The method for detecting a linear image in a planar picture according to claim 8, wherein said CCD imaging element is mounted on a camera having a wide angle and short exposure time, in cases where said flying object is a meteor.

* * * * *